(12) United States Patent
Ming et al.

(10) Patent No.: US 11,881,563 B2
(45) Date of Patent: Jan. 23, 2024

(54) BATTERY

(71) Applicant: Dongguan Amperex Technology Limited, Guangdong (CN)

(72) Inventors: Bangsheng Ming, Guangdong (CN); Xuan Chen, Guangdong (CN); Ying Wang, Guangdong (CN); Mingliang Mo, Guangdong (CN)

(73) Assignee: Dongguan Amperex Technology Limited, Dongguan (CN)

( * ) Notice: Subject to any disclaimer, the term of this patent is extended or adjusted under 35 U.S.C. 154(b) by 1168 days.

(21) Appl. No.: 16/391,283

(22) Filed: Apr. 22, 2019

(65) Prior Publication Data
US 2020/0185787 A1    Jun. 11, 2020

(30) Foreign Application Priority Data

Dec. 11, 2018 (CN) .......................... 201811510802.1

(51) Int. Cl.
| | |
|---|---|
| *H01M 10/42* | (2006.01) |
| *H01M 10/058* | (2010.01) |
| *H01M 50/557* | (2021.01) |
| *H01M 50/105* | (2021.01) |
| *H01M 50/553* | (2021.01) |
| *H01M 50/55* | (2021.01) |
| *H01M 10/04* | (2006.01) |

(52) U.S. Cl.
CPC ....... *H01M 10/4235* (2013.01); *H01M 10/04* (2013.01); *H01M 10/058* (2013.01); *H01M 50/105* (2021.01); *H01M 50/55* (2021.01); *H01M 50/553* (2021.01); *H01M 50/557* (2021.01)

(58) Field of Classification Search
None
See application file for complete search history.

(56) References Cited

U.S. PATENT DOCUMENTS

| | | | | |
|---|---|---|---|---|
| 11,552,357 | B2 * | 1/2023 | Kim | ........................ B32B 15/18 |
| 2018/0309108 | A1 * | 10/2018 | Shin | .................... H01M 50/491 |
| 2019/0189977 | A1 * | 6/2019 | Guo | .................... H01M 50/224 |

(Continued)

FOREIGN PATENT DOCUMENTS

| | | | |
|---|---|---|---|
| CN | 102170019 A | | 8/2011 |
| CN | 203733893 U | * | 7/2014 |
| CN | 203800127 U | | 8/2014 |

(Continued)

OTHER PUBLICATIONS

International Search Report dated Mar. 12, 2020, in corresponding International Application No. PCT/CN2019/124662; 8 pages (with English Translation).

(Continued)

*Primary Examiner* — Maria Laios
(74) *Attorney, Agent, or Firm* — Maier & Maier, PLLC (57) ABSTRACT

The present application provides a battery including an electrode assembly, a package encapsulating the electrode assembly, and a plurality of bonding portions located between the package and the electrode assembly, wherein at least partially of the bonding portions are disposed at interval. The purpose of the present application is to provide a battery that reduces the tear risk of the aluminum foil and improves safety.

19 Claims, 12 Drawing Sheets

(56) References Cited

U.S. PATENT DOCUMENTS

2019/0229361 A1* 7/2019 Kim .................. H01M 50/124
2022/0131217 A1* 4/2022 Kim ........................ B32B 7/12

FOREIGN PATENT DOCUMENTS

| | | |
|---|---|---|
| CN | 105895860 A | 8/2016 |
| CN | 103247764 B | 12/2016 |
| CN | 205882084 U | 1/2017 |
| CN | 108242573 A | 7/2018 |
| CN | 108767284 A | 11/2018 |
| CN | 110071322 A | 7/2019 |
| CN | 110265596 A | 9/2019 |
| CN | 110323365 A | 10/2019 |
| JP | 2002305032 A | 10/2002 |
| JP | 2015103370 A | 6/2015 |
| KR | 1020150037078 A | 4/2015 |

OTHER PUBLICATIONS

First Office Action dated Nov. 12, 2020, in corresponding Chinese Application No. 201811510802.1; 14; pages (with English Translation).

Second Office Action dated Jun. 11, 2021, in corresponding Chinese Application No. 201811510802.1; 24; pages (with English Translation).

\* cited by examiner

BATTERY

PRIORITY CLAIM AND CROSS-REFERENCE

This application claims priority to and benefits of Chinese Patent Application Serial No. 201811510802.1 filed with China National Intellectual Property Administration on Dec. 11, 2018, entitled "BATTERY", and the entire content of which is incorporated herein by reference.

FIELD OF THE APPLICATION

The present application relates to the field of electrochemistry, in particular, to a battery.

BACKGROUND OF THE APPLICATION

Batteries are widely used in electronic products to provide power as needed. The electronic products, especially mobile electronic products, may be dropped during use, so it is necessary to ensure that the battery components may not be damaged under dropping conditions. Therefore, it is necessary to fix a package casing and an electrode assembly of the battery in the production process, so as to avoid damage due to a large mutual displacement during the falling process.

In the current battery production process, the package casing and the electrodes inside are bonded by glue to achieve a firm connection. However, in the current dropping process, etc., there is still a problem of aluminum foil tearing of the outermost layer of the electrode assembly, which affects battery safety.

SUMMARY OF THE APPLICATION

For problems in prior art, the purpose of the present application is to provide a battery that reduces the tear risk of the aluminum foil and improve safety.

To achieve the above purpose, the present application provides a battery including an electrode assembly, a package enclosing the electrode assembly, and a plurality of bonding portions at least partially spaced apart and located between the package and the electrode assembly.

According to an embodiment of the present application, each of the plurality of bonding portions has a thickness of about 1 µm to 50 µm.

According to an embodiment of the present application, the electrode assembly includes a first electrode, a second electrode, and an adhesive layer disposed between the first electrode and the second electrode.

According to an embodiment of the present application, the plurality of bonding portions are arranged in an array.

According to an embodiment of the present application, the plurality of bonding portions are arranged in a dot array or a strip array.

According to an embodiment of the present application, the plurality of bonding portions are arranged in a dot array, and a minimum distance between two adjacent bonding portions in a diagonal direction of the battery is in a range of 0 to 100 mm (0 refers to a continuous large piece of glue).

In one embodiment of the present application, the minimum distance is preferably 0.1 to 40 mm.

In one embodiment of the present application, the minimum distance is preferably 0.2 to 20 mm.

In one embodiment of the present application, the minimum distance is more preferably 0.3 to 10 mm.

The above numerical ranges include the endpoint values.

According to an embodiment of the present application, the plurality of bonding portions are arranged in a dot array. A distance between two adjacent bonding portions in a length direction of the battery is in a range of 0 to 500 mm (0 refers to a continuous large piece of glue).

In one embodiment of the present application, the distance between two adjacent bonding portions is preferably 0.1 to 100 mm.

In one embodiment of the present application, the distance between two adjacent bonding portions is preferably 0.5 to 70 mm.

In one embodiment of the present application, the distance between two adjacent bonding portions is preferably 0.8 to 30 mm.

In one embodiment of the present application, the distance between two adjacent bonding portions is preferably 1 to 10 mm.

A distance between two adjacent bonding portions in a width direction of the battery is in the range of 0 to 100 mm.

In one embodiment of the present application, the distance between two adjacent bonding portions in the width direction of the battery is preferably 0.1 to 80 mm.

In one embodiment of the present application, the distance between two adjacent bonding portions in the width direction of the battery is preferably 0.3 to 60 mm.

In one embodiment of the present application, the distance between two adjacent bonding portions in the width direction of the battery is preferably 0.5 to 30 mm.

The above numerical ranges all include endpoint values.

According to an embodiment of the present application, a distance between the topmost bonding portion and the top edge of the battery in a length direction of the battery is in a range of 0 to 100 mm (0 refers to a continuous large piece of glue).

In an embodiment of the present application, the distance is preferably 0.1 to 50 mm.

In an embodiment of the present application, the distance is preferably 0.2 to 10 mm.

In one embodiment of the present application, the distance is preferably 0.3 to 5 mm. And A distance between the outermost bonding portion and the side edge of the battery in a width direction of the battery is in the range of 0 to 100 mm. Wherein in one embodiment of the present application, the distance is preferably 0.1 to 50 mm. In one embodiment of the present application, the distance is preferably 0.2 to 10 mm. In one embodiment of the present application, the distance is preferably 0.3 to 8 mm. The above numerical ranges all include endpoint values.

According to an embodiment of the present application, the bonding portion has a circular shape and a radius of 0.1 to 500 mm. In an embodiment of the present application, the radius of the bonding portion is preferably 0.2 to 300 mm. In an embodiment of the present application, the radius of the bonding portion is preferably 0.3 to 50 mm. In an embodiment of the present application, the radius of the bonding portion is preferably 0.4 to 10 mm. The above numerical ranges all include endpoint values. According to an embodiment of the present application, the bonding portion has a rectangular shape and includes a first side extending in the width direction of the battery and a second side extending in the length direction of the battery, wherein the length of the first side is in the range of 0.1 to 1000 mm. In an embodiment of the present application, the length of the first side is preferably 0.2 to 160 mm. In an embodiment of the present application, the length of the first side is preferably 0.3 to 90 mm. The length of the second side is in the range of 0 to 1000 mm. In an embodiment of the present application, the length of the second side is preferably 0.1 to 150 mm. In an embodiment of the present application, the length of the second side is preferably 0.3 to 90 mm. The above numerical ranges all include endpoint values.

According to an embodiment of the present application, the bonding portion has a triangle shape, wherein in the length direction of the battery, the bonding portion has a height of in the range of 0.1 to 1000 mm. In an embodiment of the present application, the height of the bonding portion is preferably 0.2 to 150 mm. In an embodiment of the present application, the height of the bonding portion is preferably 0.3 to 90 mm. The bottom angle of the bonding portion is in the range of 0.1° to 90°. In an embodiment of the present application, the bottom angle of the bonding portion is preferably 0.2° to 60°. In an embodiment of the present application, the bottom angle of the bonding portion is preferably 0.3° to 30°. The above numerical ranges all include endpoint values.

According to an embodiment of the present application, the plurality of interval bonding portions form a plurality of bonding units extending in a first direction of the electrode assembly, each of the bonding units includes a plurality of the bonding portions partially overlapping in a thickness direction of the battery.

According to an embodiment of the present application, the first direction includes any one of a length direction, a width direction, and a diagonal direction of the electrode assembly.

According to an embodiment of the present application, the plurality of bonding portions are identical.

According to an embodiment of the present application, the total area of the plurality of bonding portions accounts for 5% to 100% of the surface area of the electrode assembly.

According to an embodiment of the present application, the electrode assembly includes a first outer surface and a second outer surface in a thickness direction of the battery and the plurality of bonding portions are disposed on at least one of the first outer surface and the second outer surface.

The battery provided in the present application has the advantages as follows:

By providing a plurality of bonding portions, and making the position relatively free, the shear stress can be greatly dispersed. The wear-stress the battery suffered when dropping is more evenly dispersed, and the stress concentration may be reduced. Therefore, the risk of aluminum foil tearing of the outermost layer of the electrode assembly may be reduced, so as to improve the safety performance of the battery.

BRIEF DESCRIPTION OF THE ACCOMPANYING DRAWINGS

FIG. 1b is a partial view of the bonding portion of the embodiment in FIG. 1a;

FIG. 2b is a partial view of the bonding portion of the embodiment in FIG. 2a;

FIG. 3b is a partial view of the bonding portion of the embodiment in FIG. 3a;

DETAILED DESCRIPTION OF THE EMBODIMENTS

The embodiments of the present application are described in detail below with reference to FIG. 1 to FIG. 8 of the accompanying drawings. It should be noted that, hereinafter, the direction along the length of the battery 10 refers to the direction along the arrow L; and the direction along the width of the battery 10 refers to the direction along the arrow W. In addition, the "larger" and "smaller" used to describe the dimensions hereinafter are not specifically limited in numerical value, and may be redefined according to different usage scenarios of the battery 10.

In an embodiment of the present application, the battery 10 includes an electrode assembly 12, a package 11 enclosing the electrode assembly 12, and a plurality of bonding portions 14. The plurality of bonding portions 14 are arranged at least partially spaced apart and located between the package 11 and the electrode assembly 12.

In the present embodiment, the plurality of bonding portions 14 are provided not only to increase the area of the bonding portion 14, but also to disperse the wear-stress of the battery 10 during dropping, thereby reducing stress concentration and the tear risk of the aluminum foil. In addition, the bonding portions 14 are at least partially spaced apart to facilitate uniformity of the overall thickness of the battery 10, to avoid poor interface performance of the electrode assembly 12 due to uneven thickness of the battery 10, and to avoid degradation of cycle performance.

In an embodiment of the present application, each of the plurality of bonding portions 14 has a thickness between 1 μm and 50 μm. The bonding portions 14 are thin, so the degree of reduction in energy density of the battery 10 may be reduced without reducing the adhesion.

In addition, in one or more embodiments, the thickness of each bonding portion 14 is preferably set to be between 35 μm and 50 μm, which causes an energy density loss of only 1% to 4%. Therefore, it is more helpful to improve the performance of the battery 10.

In an embodiment of the present application, the electrode assembly 12 includes a first electrode and a second electrode, and an adhesive layer (not shown) is disposed between the first electrode and the second electrode. In the present embodiment, the adhesive layer allows the first electrode and the second electrode to be more tightly bonded, thereby the electrode assembly 12 is formed as a tightly bonded unit. The electrode assembly 12 and the package form a solid unit of the battery 10 through the bonding portions 14. Therefore, the battery 10 improves the cycle performance of the battery 10 while improving the tearing of the battery 10 when it is dropped.

In an embodiment of the present application, the adhesive layer disposed between the first electrode and the second electrode is located on a surface of the first electrode.

In an embodiment of the present application, the adhesive layer disposed between the first electrode and the second electrode is located on a surface of the second electrode.

In an embodiment of the present application, the adhesive layer disposed between the first electrode and the second electrode is located on a surface of a separator between the first electrode and the second electrode.

In an embodiment of the present application, the pluralities of bonding portions 14 are arranged in an array. In the present embodiment, all of the bonding portions 14 may be arranged in an array, or only a portion of the bonding portions 14 may be arranged in an array. During the dropping of the battery 10, the arrangement of arrays helps to distribute the wear-stress evenly, reduce stress concentration, and reduce the tear risk of the aluminum foil. When only a portion of the bonded portions 14 are arranged in an array, the other portions may be arranged freely. That is to say, the other portion may be arranged focusing in the area where the aluminum foil is easy to be torn, which not only reduces the tear risk of the aluminum foil, but also reduces the amount of glue used. Thereby, the effect on the energy density of the battery 10 is reduced, and the performance of the battery 10 is further improved.

In an embodiment of the present application, the pluralities of bonding portions 14 are arranged in a dot array or a strip array. The dot array arrangement has the advantage of wide and relatively more uniform distribution, which helps to reduce the tear risk of the aluminum foil. The advantage of the strip array arrangement is that the bonding portion 14 is continuous, helping to achieve a critical distribution of the bonding portions 14 in the area where the aluminum foil is easy to be torn, which also helps to reduce the tear risk of the aluminum foil. Of course, in other embodiments, a combination of a dot array arrangement and a strip array arrangement may be employed.

In an embodiment of the present application, the plurality of bonding portions 14 are arranged in a dot array, and a minimum distance between two adjacent bonding portions 14 (i.e., a first diagonal distance m and a second diagonal distance n) in a diagonal direction of the battery 10 is in a range of 0 to 100 mm (0 refers to a continuous large piece of glue). In an embodiment of the present application, the minimum distance is preferably 0.1 to 40 mm. In an embodiment of the present application, the minimum distance is preferably 0.2 to 20 mm. In an embodiment of the present application, the minimum distance is preferably 0.3 to 10 mm. And the above numerical ranges include the endpoint values.

In the present embodiment, the first diagonal distance m and the second diagonal distance n are both controlled within the above size range, which may improve the wear-stress of the battery 10 during the dropping, and help to solve the problem that an outermost layer of the electrode assembly 12 being torn when dropped due to the lateral peeling force. Therefore, it is helpful to improve the performance of the battery 10.

In an embodiment of the present application, the plurality of bonding portions 14 are arranged in a dot array, a distance (i.e., a longitudinal spacing X) between two adjacent bonding portions 14 in a length direction of the battery 10 is in a range of 0 to 500 mm (0 refers to a continuous large piece of glue). In an embodiment of the present application, the distance is preferably 0.1 to 100 mm. In an embodiment of the present application, the distance is preferably 0.5 to 70 mm. In an embodiment of the present application, the distance is preferably 0.8 to 30 mm. In an embodiment of the present application, the distance is preferably 1 to 10 mm.

And a distance (i.e., a horizontal spacing Y) between two adjacent bonding portions 14 in a width direction of the battery 10 is in the range of 0 to 100 mm. In an embodiment of the present application, the distance between two adjacent bonding portions 14 in a width direction of the battery 10 is preferably 0.1 to 80 mm. In an embodiment of the present application, the distance between two adjacent bonding portions 14 in a width direction of the battery 10 is preferably 0.3 to 60 mm. In an embodiment of the present application, the distance between two adjacent bonding portions 14 in a width direction of the battery 10 is preferably 0.5 to 30 mm. The above numerical ranges all include endpoint values. In the present embodiment, controlling the sizes of the longitudinal spacing X and/or the horizontal spacing Y are helpful to control the density of the bonding portion 14 in a certain area. That is, if it is desired to distribute the bonding portion 14 mainly in the area where the aluminum foil is easy to be torn, the longitudinal spacing X and/or the horizontal spacing Y may be smaller or even zero. If for the area where the aluminum foil is not easy to be torn, values of the longitudinal spacing X and/or the lateral spacing Y may be larger, which reduces the amount of glue used on the one hand and avoids an increase in the energy density loss of the battery 10 due to excessive glue.

In an embodiment of the present application, a distance between the topmost bonding portion 14 and the top edge of the battery 10 in a length direction of the battery 10 (i.e., a top spacing A) is in a range of 0 to 100 mm (0 refers to a continuous large piece of glue). In an embodiment of the present application, the distance between the topmost bonding portion 14 and the top edge of the battery 10 in a length direction of the battery 10 is preferably 0.1 to 50 mm. In an embodiment of the present application, the distance between the topmost bonding portion 14 and the top edge of the battery 10 in a length direction of the battery 10 is preferably 0.2 to 10 mm. In an embodiment of the present application, the distance between the topmost bonding portion 14 and the top edge of the battery 10 in a length direction of the battery 10 is preferably 0.3 to 5 mm. And, a distance between the outermost bonding portion 14 and the side edge of the battery 10 in a width direction of the battery 10 (i.e., a side spacing Z) is in a range of 0 to 100 mm (0 refers to a continuous large piece of glue). In an embodiment of the present application, the distance between the outermost bonding portion 14 and the side edge of the battery 10 in a width direction of the battery 10 is preferably 0.1 to 50 mm. In an embodiment of the present application, the distance between the outermost bonding portion 14 and the side edge of the battery 10 in a width direction of the battery 10 is preferably 0.2 to 10 mm. In an embodiment of the present application, the distance between the outermost bonding portion 14 and the side edge of the battery 10 in a width direction of the battery 10 is preferably 0.3 to 8 mm. The above numerical ranges all include endpoint values.

In the present embodiment, the top spacing A and the side spacing Z are both controlled within the above-mentioned size range, which improves the edge performance of the battery 10. That is to say, the edge of the battery 10 is an area that is easy to suffer from impact, and it is necessary to strengthen the bonding as much as possible, so the top spacing A and the side spacing Z are both controlled within 0 to 100 mm. This range may effectively enhance the bonding around the battery 10, and avoid the loss of the energy density of the battery 10 due to excessive glue meanwhile.

In an embodiment of the present application, the bonding portion 14 has a circular shape, and the radius of the bonding portion 14 (i.e., a radius r) is in the range of 0.1 to 500 mm. In an embodiment of the present application, the radius of the bonding portion 14 is preferably 0.2 to 300 mm. In an embodiment of the present application, the radius of the bonding portion 14 is preferably 0.3 to 50 mm. In an embodiment of the present application, the radius of the bonding portion 14 is preferably 0.4 to 10 mm. The above numerical ranges all include endpoint values. In the present embodiment, when the radius r of the bonding portion 14 is small, the bonding portions 14 may be arranged in a dot array, so that the stress dispersion of the battery 10 during dropping is more uniform; when the radius r of the bonding portion 14 is large, the bonding portion 14 may be distributed in an area where the aluminum foil is easy to be torn, to enhance the firmness of the easily torn portion. Of course, in some embodiments, the arrangement of the dot arrays and focusing the distribution in the easily torn portions may be combined.

In an embodiment of the present application, the bonding portion 14 has a rectangular shape and includes a first side a extending in the width direction of the battery 10 and a second side b extending in the length direction of the battery 10. Among them, the length of the first side a is in the range of 0.1 to 1000 mm. In an embodiment of the present application, the length of the first side a is preferably 0.2 to 160 mm. In an embodiment of the present application, the length of the first side a is preferably 0.3 to 90 mm. The length of the second side b is in the range of 0 to 1000 mm. In an embodiment of the present application, the length of the second side b is preferably 0.1 to 150 mm. In an embodiment of the present application, the length of the second side b is preferably 0.3 to 90 mm. The above numerical ranges all include endpoint values.

In the present embodiment, when the first side a and the second side b of the bonding portion 14 are small, the bonding portions 14 may be arranged in a dot array form, so that the stress dispersion of the battery 10 during dropping is more uniform. When the first side a and/or the second side b of the bonding portion 14 are large, the bonding portion 14 may be arranged in a strip array form, and mainly distributed in an area where the aluminum foil is easy to be torn, to enhance the firmness of the easily torn portion. Of course, in some embodiments, it is possible to combine the arrangement of the dot array form and the arrangement of the strip array form.

In an embodiment of the present application, the bonding portion 14 has a triangle shape, wherein in the length direction of the battery 10, a height h of the bonding portion 14 is in the range of 0.1 to 1000 mm. In an embodiment of the present application, the height h of the bonding portion 14 is preferably 0.2 to 150 mm. And a bottom angle d of the bonding portion 14 is in the range of 0.1° to 90°. In an embodiment of the present application, the bottom angle d of the bonding portion 14 is preferably 0.2° to 60°. In an embodiment of the present application, the bottom angle d of the bonding portion 14 is preferably 0.3° to 30°. The above numerical ranges all include endpoint values.

In the present embodiment, when the height h of the bonding portion 14 is small, the bonding portions 14 may be arranged in a dot array form, so that the stress dispersion of the battery 10 during dropping is more uniform; when the height h of the bonding portion 14 is large, the bonding portion 14 may be arranged in a strip array form, and mainly distributed in an area where the aluminum foil is easy to be torn, to enhance the firmness of the easily torn portion. Of course, in some embodiments, it is possible to combine the arrangement of the dot array form and the arrangement of the strip array form. Further, controlling the bottom angle d of the bonding portion 14 within a range of 0.1 to 90 degrees helps to control the density of the bonding portion 14, and avoids a large range of glue-free regions due to the obtuse angle, where the aluminum foil is easy to be torn.

In an embodiment of the present application, the plurality of bonding portions 14 form a plurality of bonding units extending in a first direction of the electrode assembly 12, each bonding unit includes a plurality of the bonding portions 14 partially overlapping in a thickness direction of the battery 10, and adjacent ones of the bonding units are arranged spaced apart.

In the present embodiment, the plurality of bonding portions 14 are overlapped in a first direction of the electrode assembly 12, that is, the longitudinal spacing X is 0 mm. Of course, the first diagonal distance m has a value of 0 mm and the second diagonal distance n has a value of 0 mm. In this manner, a plurality of bonding units extending in the first direction of the electrode assembly 12 are connected to form the bonding portions 14 arranged in a strip array form, helping to distribute the aluminum foil mainly in an easily torn area to enhance the firmness of the easily torn portion.

In an embodiment of the present application, the first direction includes any one of a length direction, a width direction, and a diagonal direction of the electrode assembly 12. In the present embodiment, the arrangement of the bonding portion 14 is flexible and free, and different locations may be adopted according to different usage scenarios of the battery 10, which improves the performance of the battery 10.

In an embodiment of the present application, each bonding portion 14 of the plurality of bonding portions 14 has the same shape and size. In the present embodiment, the shape and size are the same, which helps to uniformly disperse the stress during dropping of the battery 10 in the bonding portion 14, and thus effectively avoiding stress concentration and avoiding the tear of the aluminum foil.

Of course, in other embodiments, only a part of the bonding portions 14 may be identical in shape and size, or the shape and size of any of the bonding portions 14 may be different. That is to say, it is not limited in the present application, and the optimized design may be performed according to the actual use environment of the battery 10.

In an embodiment of the present application, the total area of the plurality of bonding portions 14 accounts for 5% to 100% of the surface area of the electrode assembly 12. In the present embodiment, the coverage of the bonding portion 14 is extremely large, which is close to the overall coverage of the electrode assembly 12, which contributes to the fact that the aluminum foil is not easy to be torn, and the overall firmness of the battery 10 is enhanced. The present embodiment is particularly suitable for scenarios where the firmness of the battery 10 is required to be high.

In an embodiment of the present application, the electrode assembly 12 includes a first outer surface and a second outer surface in the thickness direction of the battery 10, and the plurality of bonding portions 14 are disposed on at least one of the first outer surface and the second outer surface. In the present embodiment, the bonding portion 14 is disposed on the first outer surface and the second outer surface of the electrode assembly 12 to make the bonding inside the battery 10 stronger, then the aluminum foil is less likely to be torn, thereby improving the performance of the battery 10.

The present application will be described in detail below with reference to the accompanying drawings.

Figure 1:
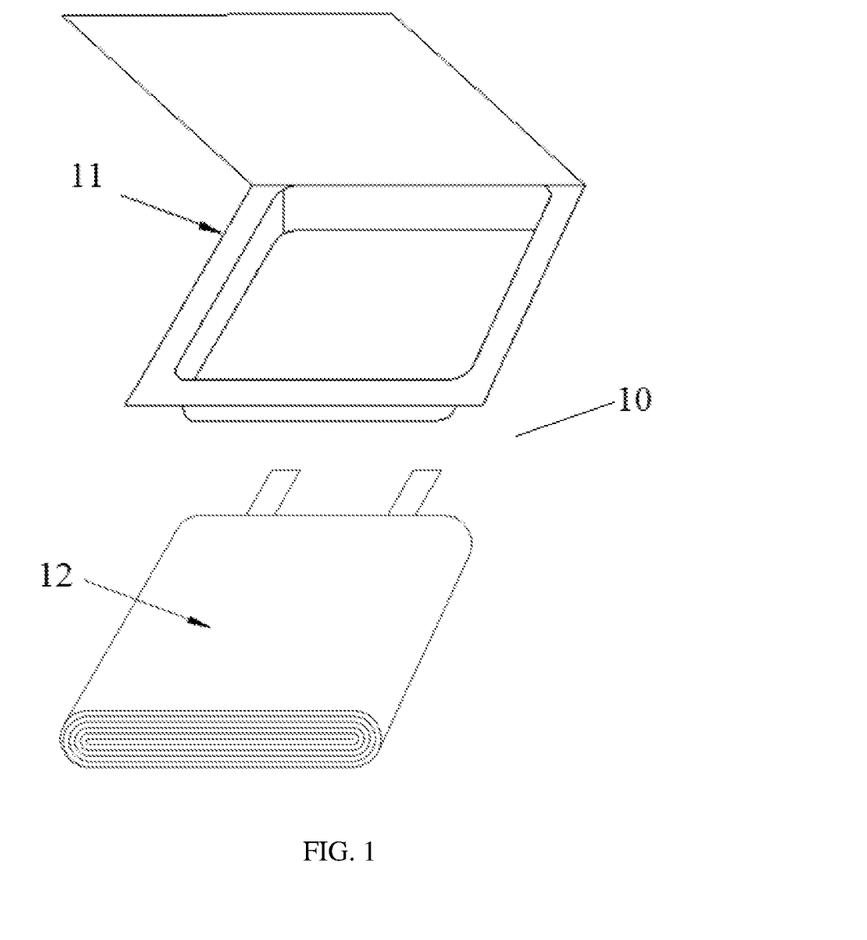
FIG. 1 is an exploded view of a battery of the present application.

As shown in FIG. 1, in an embodiment of the present application, the battery 10 includes an electrode assembly 12 and a package 11 that encloses the electrode assembly 12.

Figure 1A:
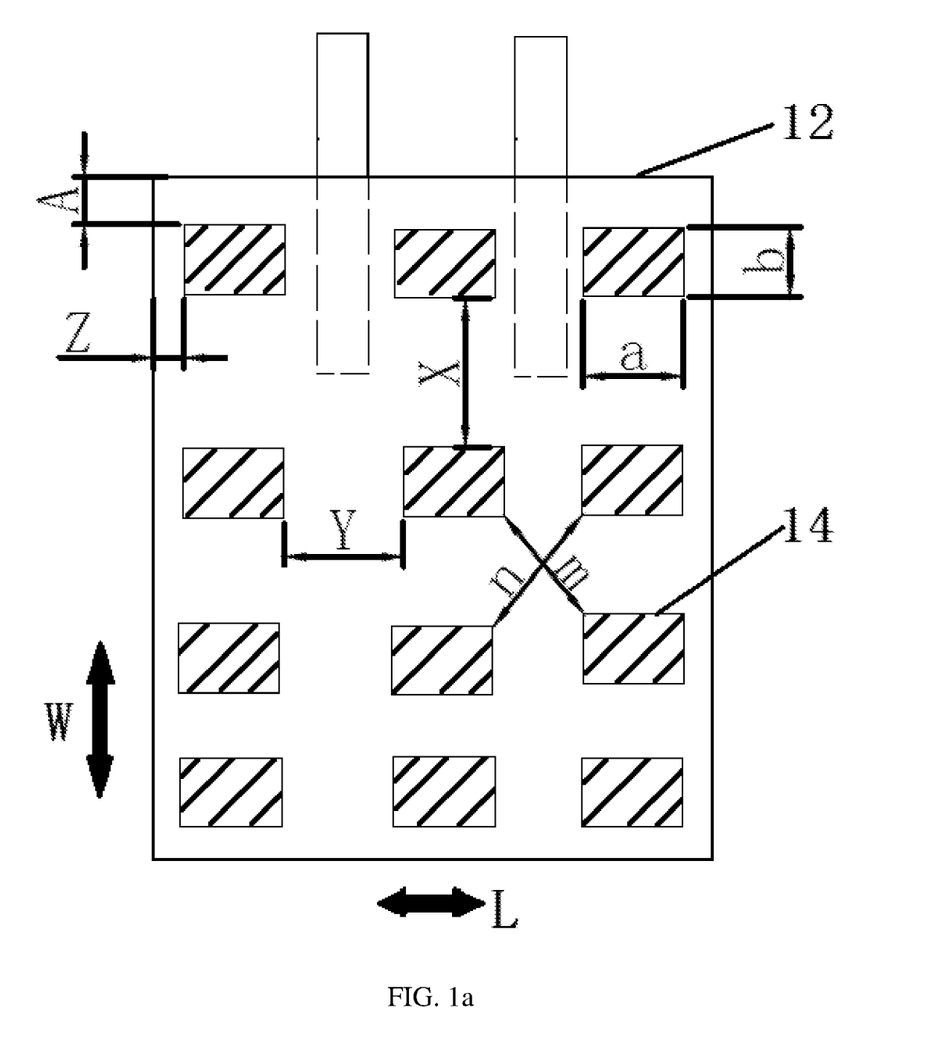
FIG. 1a is a view of an embodiment of the present application.

As shown in FIG. 1a, in an embodiment of the present application, each bonding portion 14 is provided in a rectangular shape, and the bonding portions 14 are arranged in a dot array form. Among them, in the length direction of the battery 10, the longitudinal spacing X between two adjacent bonding portions 14 is in the range of 0 to 500 mm; in the width direction of the battery 10, the horizontal spacing Y between two adjacent bonding portions 14 is in the range of 0 to 100 mm; in the diagonal direction of the battery 10, the first diagonal distance m and the second diagonal distance n between the adjacent two bonding portions 14 are all in the range of 0 to 100 mm; in the length direction of the battery 10, the top spacing A between the topmost bonding portion 14 and the top edge of the battery 10 is in the range of 0 to 100 mm; in the width direction of the battery 10, the side spacing Z between the outermost bonding portion 14 and the side edge of the battery 10 is in the range of 0 to 100 mm. In the present embodiment, by controlling the above-mentioned distances, it is possible to effectively prevent the aluminum film from being torn, to firmly bond the inside of the battery 10, and to minimize the reduction of the energy density of the battery 10 as much as possible.

Figure 1B:
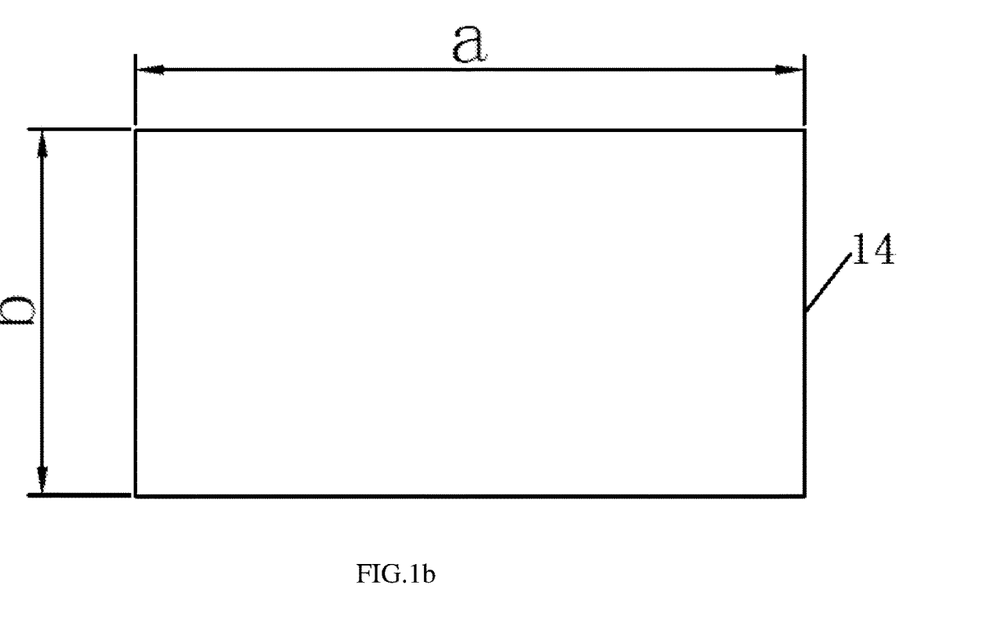

FIG. 1b is a view of one of the bonding portions 14 of the embodiment of FIG. 1. The bonding portion 14 has a rectangular shape, and the first side a ranges from 0.1 to 1000 mm, and the second side b ranges from 0 to 1000 mm. The bonding portions 14 in this size range may be arranged in a dot array form or a strip array form to help reduce the tear risk of the aluminum foil.

Figure 2A:
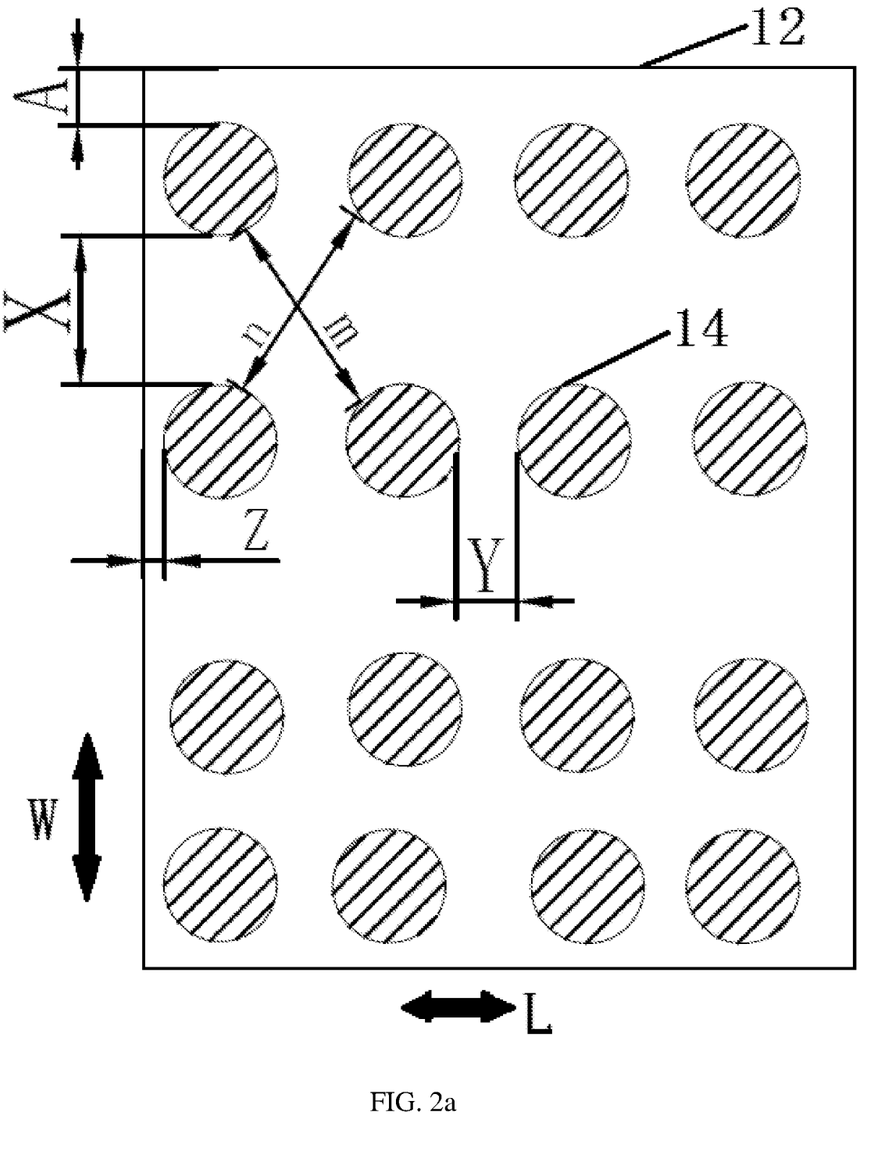
FIG. 2a is a view of another embodiment of the present application.

According to an embodiment of the present embodiment shown in FIG. 2a, each bonding portion 14 is provided in a circular shape, and the bonding portions 14 are arranged in a dot array form. Similarly, in the length direction of the battery 10, the longitudinal spacing X between two adjacent bonding portions 14 is in the range of 0 to 500 mm; in the width direction of the battery 10, the horizontal spacing Y between two adjacent bonding portions 14 is in the range of 0 to 100 mm; in the diagonal direction of the battery 10, the first diagonal distance m and the second diagonal distance n between the adjacent two bonding portions 14 are all in the range of 0 to 100 mm; in the length direction of the battery 10, the top spacing A between the topmost bonding portion 14 and the top edge of the battery 10 is in the range of 0 to 100 mm; in the width direction of the battery 10, the side spacing Z between the outermost bonding portion 14 and the side edge of the battery 10 is in the range of 0 to 100 mm. In the present embodiment, by controlling the above-mentioned distances, it is possible to effectively prevent the aluminum film from being torn, to firmly bond the inside of the battery 10, and to minimize the reduction of the energy density of the battery 10 as much as possible.

Figure 2B:
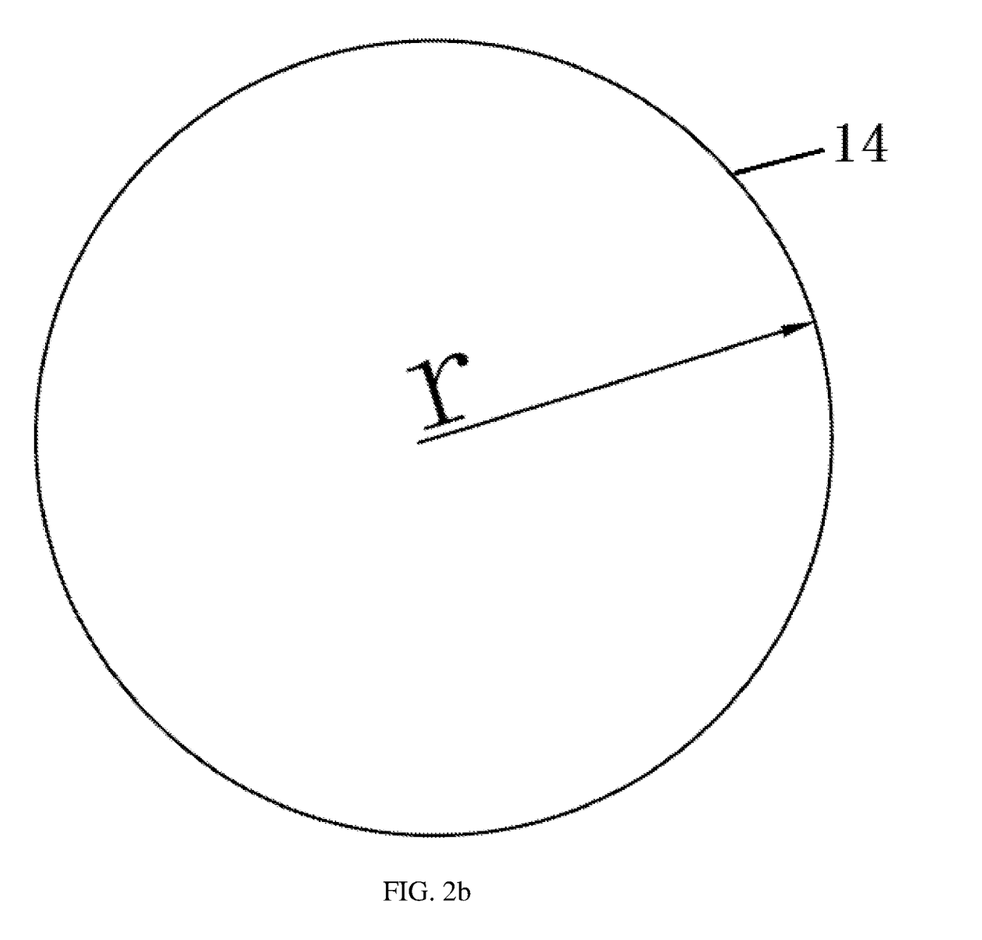

FIG. 2b is a view of one of the bonding portions 14 of the embodiment of FIG. 2a. The bonding portion 14 has a circular shape, and the radius r ranges from 0.1 to 500 mm. The bonding portions 14 in this size range may be arranged in a dot array form or a strip array form to help reduce the tear risk of the aluminum foil.

Figure 3A:
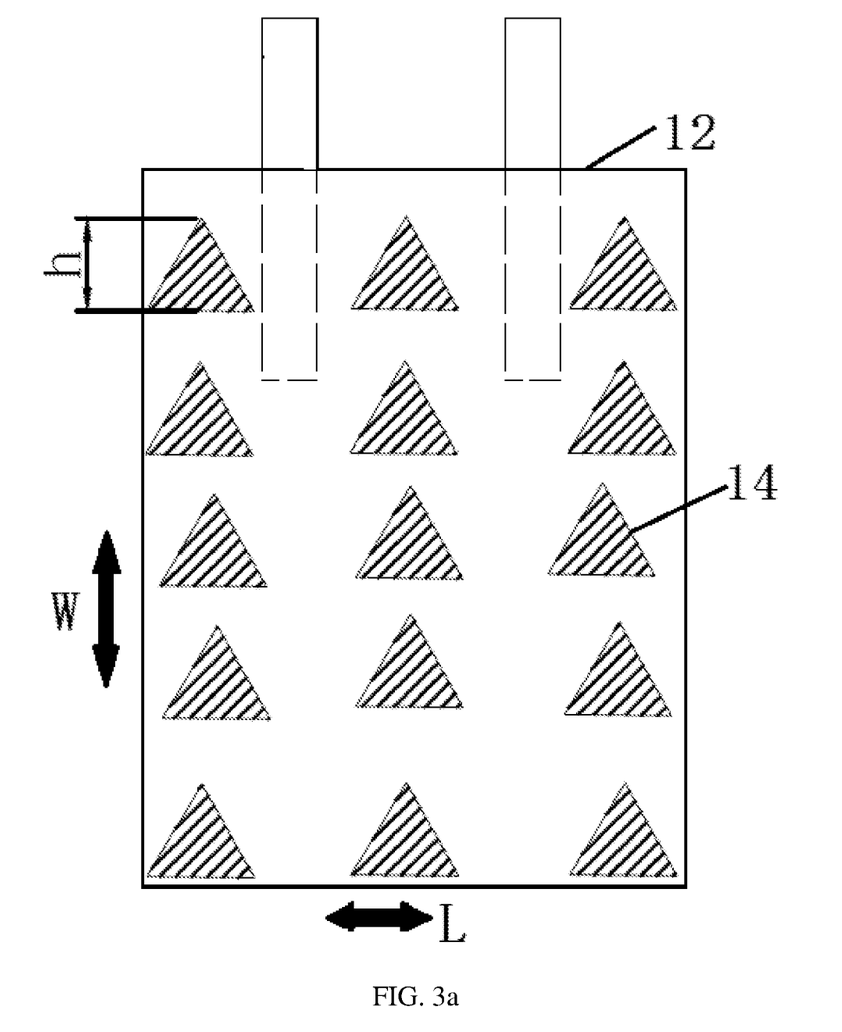
FIG. 3a is a view of another embodiment of the present application.

According to an embodiment of the present application shown in FIG. 3a, each of the bonding portions 14 is provided in a triangular shape, and the bonding portions 14 are arranged in a dot array form. Similarly, in the length direction of the battery 10, the longitudinal spacing X between two adjacent bonding portions 14 is in the range of 0 to 500 mm; in the width direction of the battery 10, the horizontal spacing Y between two adjacent bonding portions 14 is in the range of 0 to 100 mm; in the diagonal direction of the battery 10, the first diagonal distance m and the second diagonal distance n between the adjacent two bonding portions 14 are all in the range of 0 to 100 mm; in the length direction of the battery 10, the top spacing A between the topmost bonding portion 14 and the top edge of the battery 10 is in the range of 0 to 100 mm; in the width direction of the battery 10, the side spacing Z between the outermost bonding portion 14 and the side edge of the battery 10 is in the range of 0 to 100 mm. In the present embodiment, by controlling the above-mentioned distances, it is possible to effectively prevent the aluminum film from being torn, to firmly bond the inside of the battery 10, and to minimize the reduction of the energy density of the battery 10 as much as possible.

Figure 3B:
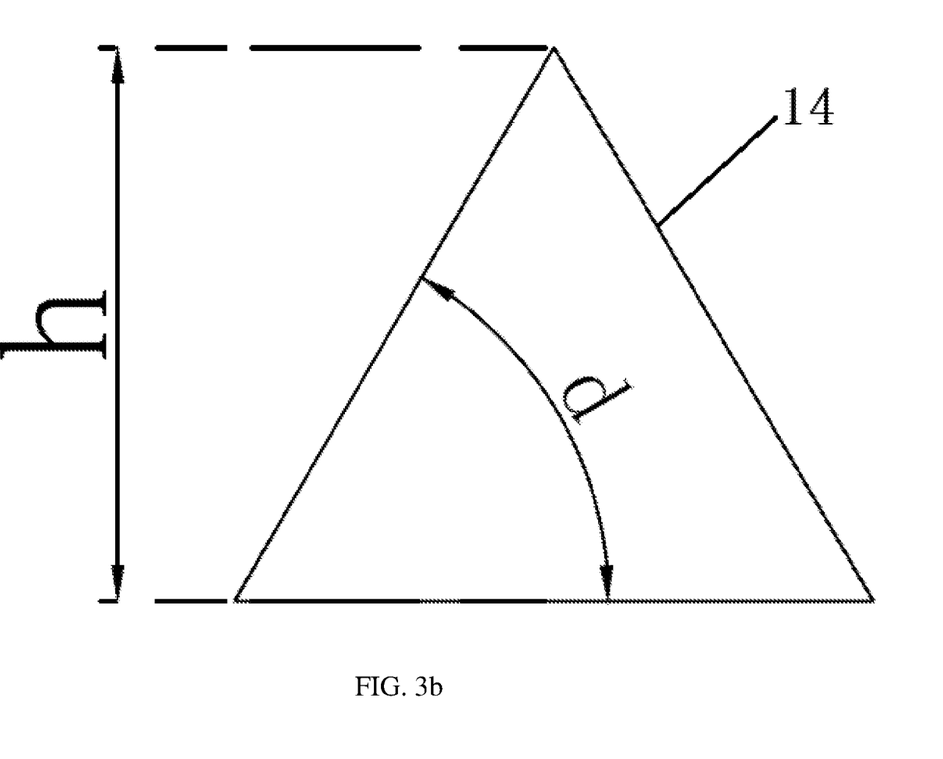

FIG. 3b is a view of one of the bonding portions 14 of the embodiment of FIG. 3a. The bonding portion 14 has a triangular shape, the height h ranges from 0.1 to 1000 mm, and the bottom angle of the bonding portion 14 is in the range of 0.1° to 90°. The bonding portions 14 in this size range may be arranged in a dot array form or a strip array form to help reduce the tear risk of the aluminum foil.

Figure 4:
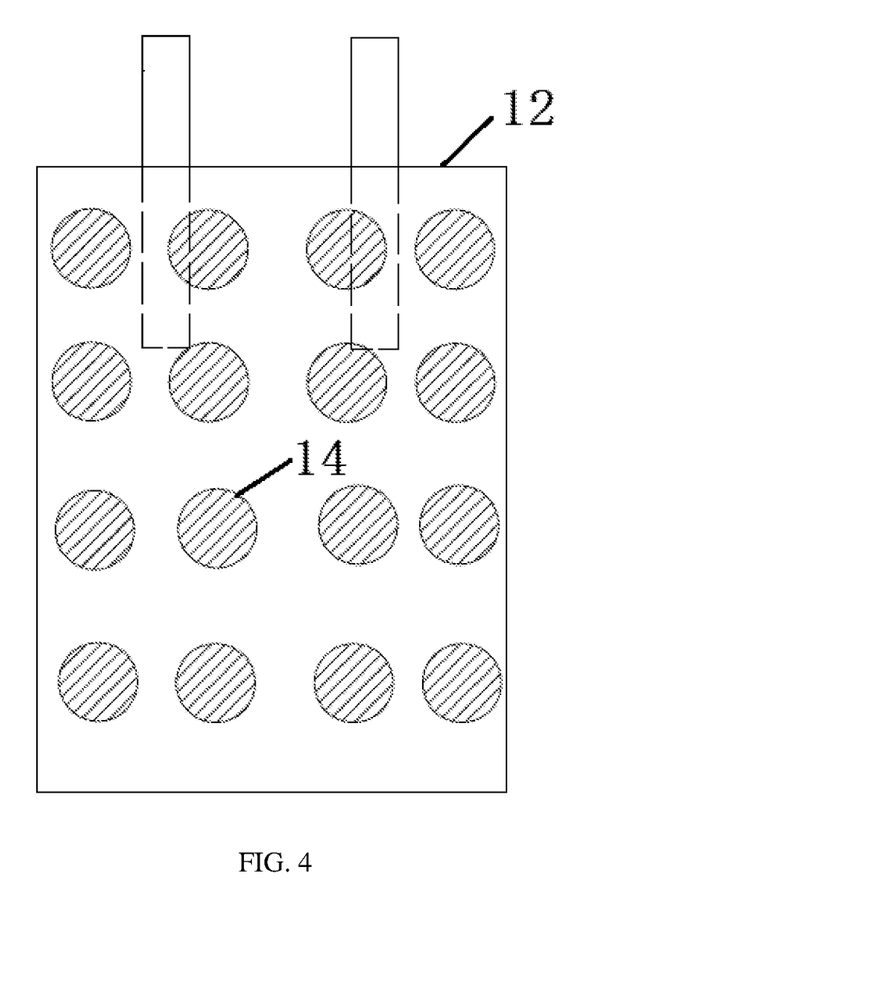
FIG. 4 is a view of still another embodiment of the present application.

According to an embodiment of the present application shown in FIG. 4, each of the bonding portions 14 is provided in an elliptical shape, and the bonding portions 14 are arranged in a dot array form. Of course, in other embodiments, the shape and size of each of the bonding portions 14 may be partially the same or all different and the technical effects of the above embodiments may also be achieved.

Figure 5:
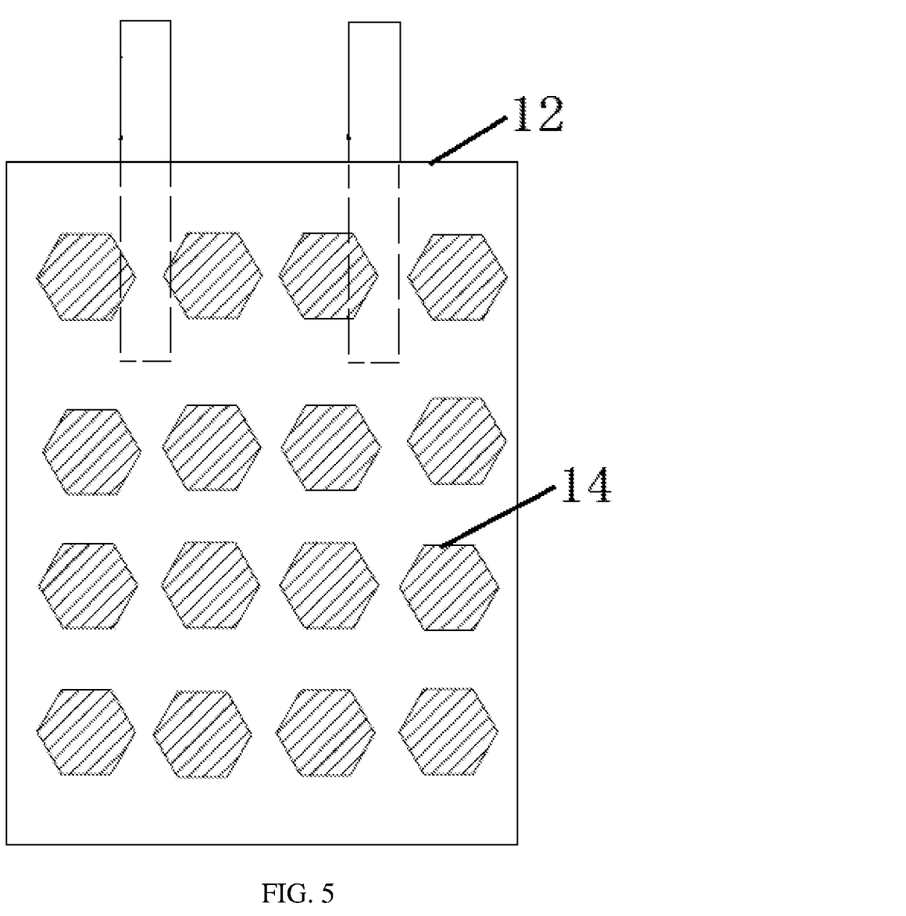
FIG. 5 is a view of still another embodiment of the present application.

According to an embodiment of the present application shown in FIG. 5, each of the bonding portions 14 is provided in a pentagon shape, and the bonding portions 14 is arranged in a dot array form. Of course, in other embodiments, the shape and size of each of the bonding portions 14 may be partially the same or all different and the technical effects of the above embodiments may also be achieved.

Figure 6:
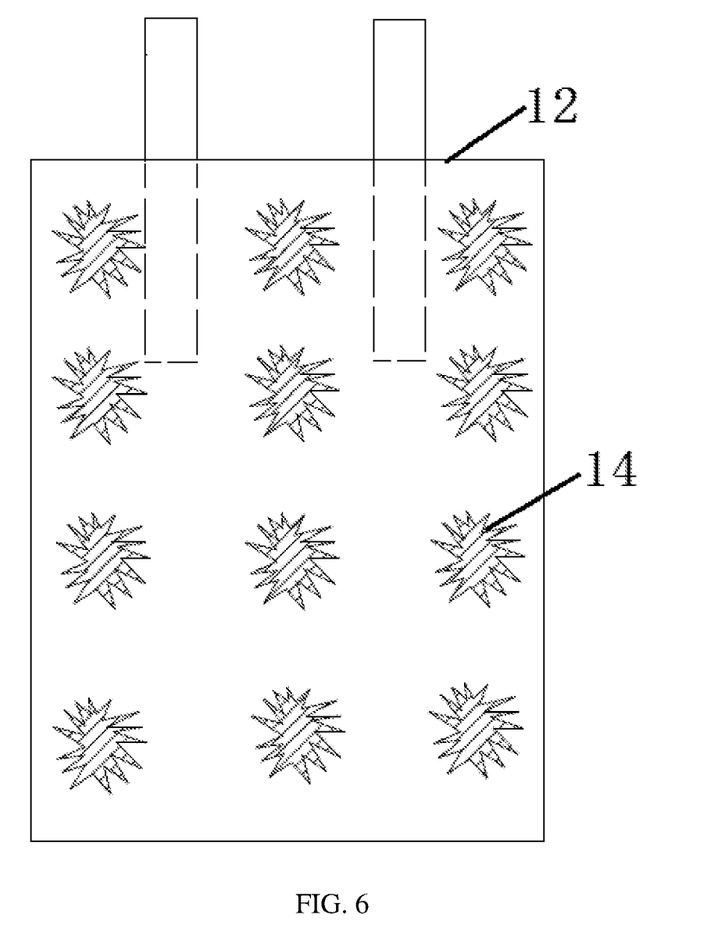
FIG. 6 is a view of still another embodiment of the present application.

According to an embodiment of the present application shown in FIG. 6, each of the bonding portions 14 is provided with an irregular shape, and the bonding portions 14 are arranged in a dot array form. Of course, in other embodiments, the shape and size of each of the bonding portions 14 may be partially the same or all different and the technical effects of the above embodiments may also be achieved.

Figure 7:
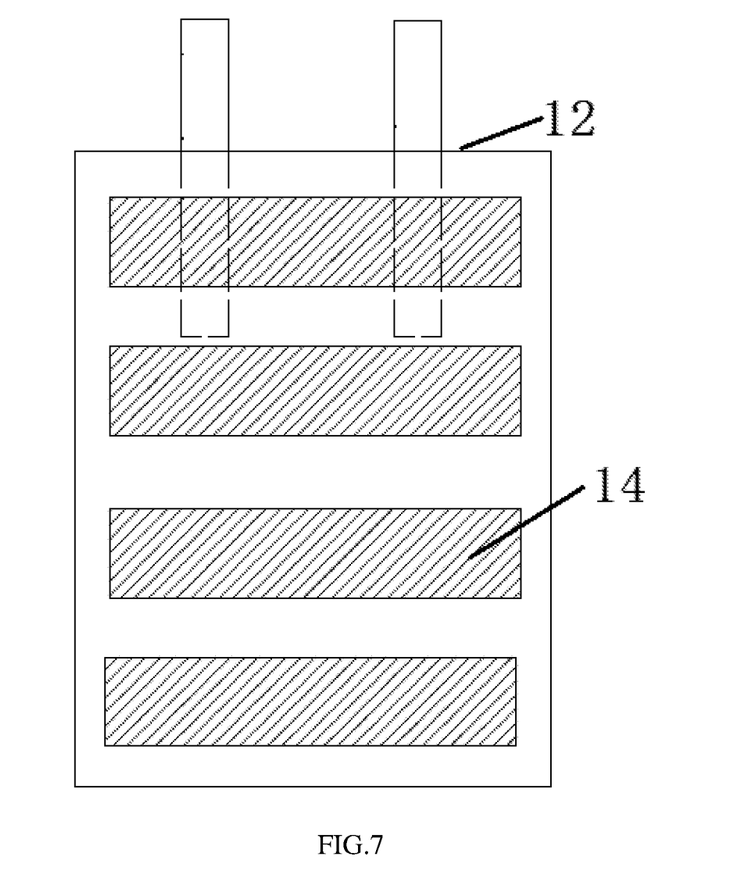
FIG. 7 is a view of another embodiment of the present application.

According to an embodiment of the present application shown in FIG. 7, the bonding portions 14 are arranged in a strip array form in the width direction of the battery 10. This helps to mainly distribute the bonding portion 14 in the area where the aluminum foil is easy to be torn, thereby reducing the tear risk of the aluminum foil. In other embodiments, the bonding portions 14 may also be arranged in a strip array form in the length direction or the diagonal direction of the battery 10.

Figure 8:
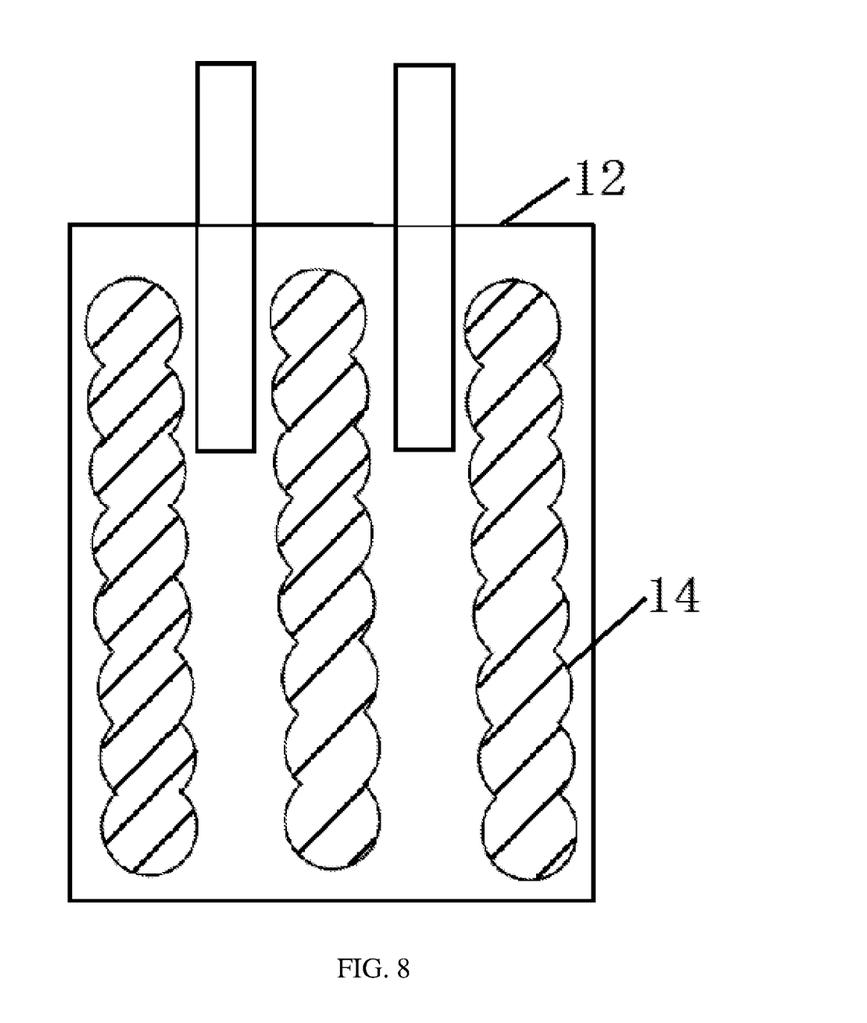
FIG. 8 is a view of another embodiment of the present application.

According to an embodiment of the present application shown in FIG. 8, the bonding portions 14 are arranged in a strip array form in the length direction of the battery 10. This helps to mainly distribute the bonding portion 14 in the area where the aluminum foil is easy to be torn, thereby reducing the tear risk of the aluminum foil. In other embodiments, the bonding portions 14 may also be arranged in a strip array form in the width direction or the diagonal direction of the battery 10.

The foregoing is merely illustrative of the preferred embodiments of the present application and is not intended to be limiting of the present application, and various changes and modifications may be made by those skilled in the art. Any modifications, equivalent substitutions, improvements, and the like within the spirit and principles of the application are intended to be included within the scope of the present application.

What is claimed is:

1. A battery, comprising:
   an electrode assembly; and
   a package enclosing the electrode assembly;
   wherein the battery further comprises a plurality of bonding portions located between the package and the electrode assembly, wherein at least a part of the plurality of bonding portions are disposed at interval; and
   wherein a distance between a topmost bonding portion and a top edge of the battery in a length direction of the battery is in the range of 5 to 100 mm;
   a distance between an outermost bonding portion and a side edge of the battery in a width direction of the battery is in the range of 8 to 100 mm; and
   a distance between two adjacent bonding portions in the length direction of the battery is in a range of 10 to 500 mm.

2. The battery according to claim 1, wherein each of the plurality of bonding portions has a thickness of about 1 μm to 50 μm.

3. The battery according to claim 1, wherein the electrode assembly comprises a first electrode, a second electrode, and an adhesive layer disposed there between.

4. The battery according to claim 1, wherein the plurality of bonding portions are arranged in an array, and wherein the array is configured to distribute wear-stress evenly during dropping of the battery.

5. The battery according to claim 4, wherein the plurality of bonding portions are arranged in a dot array or a strip array.

6. The battery according to claim 4, wherein the plurality of bonding portions are arranged in a dot array, and a minimum distance between two adjacent bonding portions in a diagonal direction of the battery is in a range of 0 to 100 mm.

7. The battery according to claim 4, wherein the plurality of bonding portions are arranged in a dot array;
   a distance between two adjacent bonding portions in a width direction of the battery is in the range of 0 to 100 mm.

8. The battery according to claim 4, wherein each of the plurality of bonding portions has a circular shape and a radius of 0.1 to 500 mm.

9. The battery according to claim 4, wherein each of the plurality of bonding portions has a rectangular shape, and comprises a first side extending in a width direction of the battery, and a second side extending in a length direction of the battery;
   wherein the length of the first side is in the range of 0.1 to 1000 mm, and the length of the second side is in the range of 0 to 1000 mm.

10. The battery according to claim 4, wherein each of the plurality of bonding portions has a triangular shape;
    in a length direction of the battery, the bonding portion has a height of in the range of 0.1 to 1000 mm; and,
    the bottom angle of the bonding portion is in the range of 0.1° to 90°.

11. The battery according to claim 1, wherein the plurality of bonding portions form a plurality of bonding units extending in a first direction of the electrode assembly, each bonding unit comprises at least two of the plurality of bonding portions partially overlapping in a thickness direction of the battery.

12. The battery according to claim 11, wherein the first direction comprises any one of a length direction, a width direction, and a diagonal direction of the electrode assembly.

13. The battery according to claim 1, wherein the plurality of bonding portions are identical.

14. The battery according to claim 1, wherein the total area of the plurality of bonding portions accounts for 5% to 100% of the surface area of the electrode assembly.

15. The battery according to claim 1, wherein the electrode assembly comprises a first outer surface and a second outer surface in a thickness direction of the battery, and the plurality of bonding portions are disposed on at least one of the first outer surface and the second outer surface.

16. A battery, comprising:
    an electrode assembly; and
    a package enclosing the electrode assembly;
    wherein the battery further comprises a plurality of bonding portions located between the package and the electrode assembly, wherein at least a part of the plurality of bonding portions are arranged in an array;
    wherein a distance between a topmost bonding portion and a top edge of the battery in a length direction of the battery is in the range of 0.1 to 100 mm,
    wherein a distance between an outermost bonding portion and a side edge of the battery in a width direction of the battery is in the range of 0.1 to 100 mm,
    wherein the array is configured to distribute wear-stress evenly during dropping of the battery; and
    wherein a distance between two adjacent bonding portions in the length direction of the battery is in a range of 10 to 500 mm.

17. The battery according to claim 16, wherein the plurality of bonding portions are arranged in a dot array or a strip array.

18. The battery according to claim 16, wherein each of the plurality of bonding portions has a circular shape, rectangular shape, or triangular shape.

19. The battery according to claim 16, wherein the plurality of bonding portions are arranged in a dot array, and a minimum distance between two adjacent bonding portions in a diagonal direction of the battery is in a range of 0 to 100 mm.

* * * * *